United States Patent
Schmid

(10) Patent No.: US 6,907,699 B2
(45) Date of Patent: Jun. 21, 2005

(54) GYPSUM WALLBOARD FASTENER

(76) Inventor: Ben L. Schmid, 203 Pearl Ave., Balboa Island, CA (US) 92662

( * ) Notice: Subject to any disclaimer, the term of this patent is extended or adjusted under 35 U.S.C. 154(b) by 0 days.

(21) Appl. No.: 10/211,809

(22) Filed: Aug. 2, 2002

(65) Prior Publication Data

US 2003/0024194 A1 Feb. 6, 2003

Related U.S. Application Data

(60) Provisional application No. 60/309,940, filed on Aug. 3, 2001.

(51) Int. Cl.$^7$ ................................................ E04F 13/04
(52) U.S. Cl. .................... 52/363; 52/481.1; 52/362; 52/361; 52/506.05; 411/399; 411/411; 411/402; 411/394
(58) Field of Search ................ 411/411, 399, 411/403, 402; 52/481.1, 344

(56) References Cited

U.S. PATENT DOCUMENTS

| | | | | |
|---|---|---|---|---|
| 213,551 A | * | 3/1879 | Doten | ........................ 411/399 |
| 493,585 A | * | 3/1893 | Herzberg | ..................... 411/399 |
| 4,572,720 A | * | 2/1986 | Rockenfeller et al. | ... 411/387.1 |
| 5,199,839 A | * | 4/1993 | DeHaitre | ................. 411/387.3 |
| 5,540,531 A | * | 7/1996 | Choiniere | ................ 411/387.1 |
| 5,890,860 A | * | 4/1999 | Dorris | ........................ 411/404 |
| 6,074,149 A | * | 6/2000 | Habermehl et al. | ......... 411/442 |
| 6,302,631 B1 | * | 10/2001 | Takasaki et al. | ............ 411/399 |
| 6,412,247 B1 | * | 7/2002 | Menchetti et al. | ......... 52/731.1 |

* cited by examiner

Primary Examiner—Carl D. Friedman
Assistant Examiner—Nahid Amiri
(74) Attorney, Agent, or Firm—Christie, Parker & Hale, LLP

(57) ABSTRACT

A fastener for securing a 0.625 inch (⅝ inch) thick gypsum wallboard panel to a wooden building frame. The fastener includes a body having a predetermined axial length. The body includes a cupped head at one axial end of the body, having a diameter that is at least in excess of 0.297 inches ($^{19}/_{64}$ inches), a threaded portion at an opposite axial end of the body and an unthreaded shank portion extending between the cupped head and the threaded portion, wherein the shank portion has an axial length that is at least in excess of one-third of the axial length of the fastener body, and a shank portion diameter that is at least in excess of 0.098 inches.

20 Claims, 2 Drawing Sheets

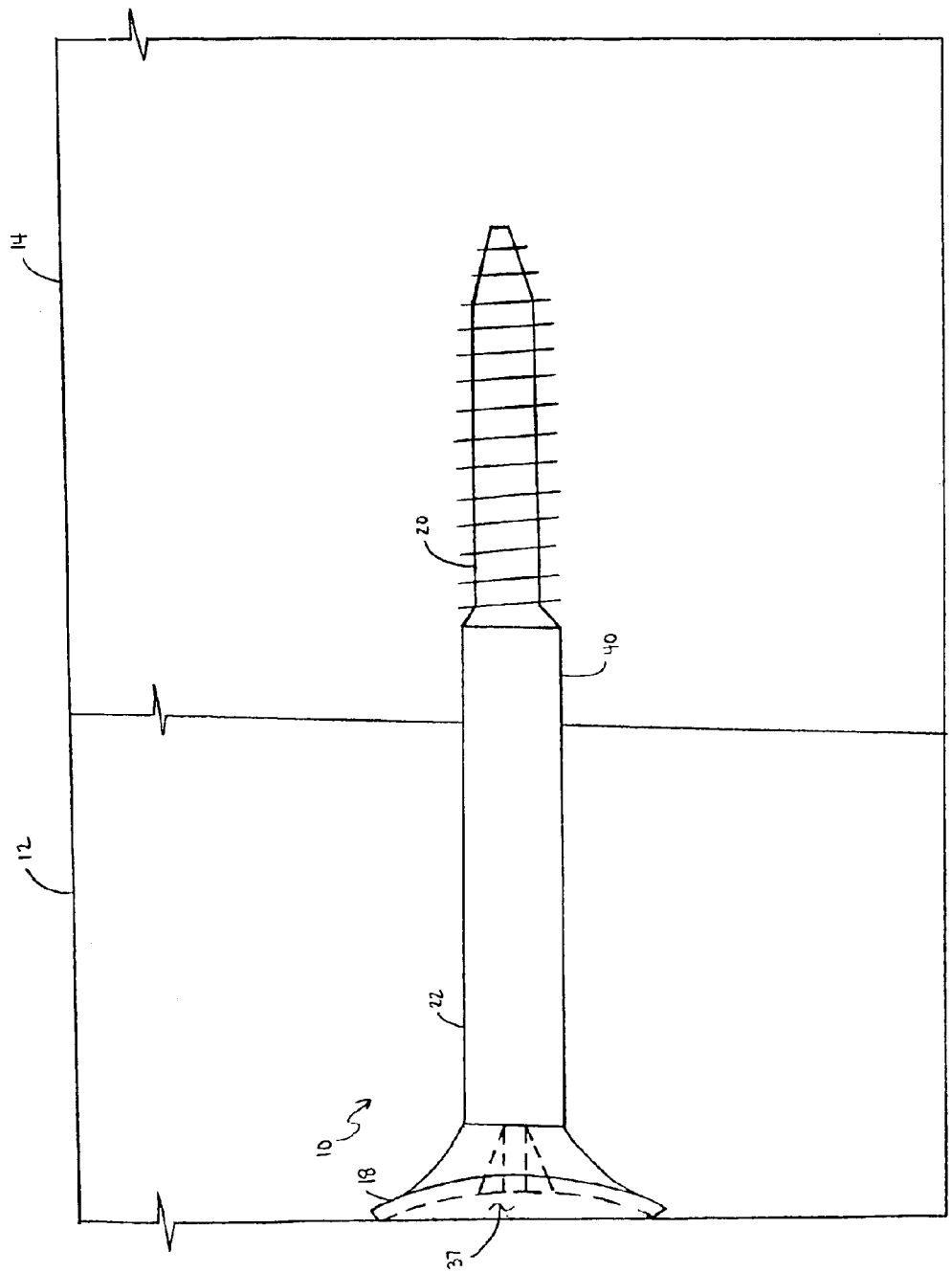

GYPSUM WALLBOARD FASTENER

CROSS-REFERENCE TO RELATED APPLICATION(S)

This application claims priority under 35 U.S.C. §119(e) to U.S. Provisional Application Ser. No. 60/309,940, filed Aug. 3, 2001. The application is also related to co-pending U.S. patent applications Ser. No. 10/211,832 filed Aug. 2, 2002 and Ser. No. 10/211,790 filed Aug. 2, 2002 each of which is incorporated by reference.

FIELD OF THE INVENTION

The present invention is related to a fastener for attaching a gypsum wallboard panel (drywall) to a wooden building frame to improve the resistance of the gypsum wallboard panel to shearing forces caused by seismic and hurricane lateral loading.

BACKGROUND

Current fasteners for attaching a gypsum wallboard panel (drywall) to a wooden building frame are inadequate in resisting shearing forces caused by seismic and hurricane lateral loading. For example, the use of fasteners specified by the Uniform Building Code for attaching a gypsum wallboard panel to a wooden building frame has resulted in severe and costly damage to interior building structures during hurricanes and Zone 4 earthquakes. As evidence, the shaking intensity during the 1994 Northridge Earthquake, having a Richter Magnitude of 5.6 (Moderate) and a Modified Mercalli Intensity of 8 to 9, caused more than 5 billion dollars worth of damage to single and multiple family units that had gypsum wallboard panels attached to wooden building frames by use of fasteners specified by the Uniform Building Code.

In addition, cyclic testing of gypsum wallboard panels fastened to wood panels by use of fasteners specified by the Uniform Building Code showed that the fasteners specified by the Uniform Building Code developed less than 60% of the lateral resistance required by the Uniform Building Code for Seismic Zone 4 loading.

Table 1, shown below, shows the specifications for the fasteners specified by the Uniform Building Code for attaching a 0.625 inch (⅝ inch) thick gypsum wallboard panel to a wooden building frame.

TABLE 1

| Type of Fastener | Axial Length of Fastener | Diameter of Fastener Shaft | Diameter of Fastener Head |
| --- | --- | --- | --- |
| No. 13 Gage Screw | 1.625 inches (1⅝ inches) | 0.092 inches | 0.297 inches (¹⁹⁄₆₄ inches) |
| Annular Ringed Nail | 1.375 inches (1⅜ inches) | 0.098 inches | Not specified |
| 6d Cooler Nail | 1.875 inches (1⅞ inches) | 0.092 inches | 0.250 inches (¹⁶⁄₆₄ inches) |
| Wallboard Nail | 1.875 inches (1⅞ inches) | 0.092 inches | 0.297 inches (¹⁹⁄₆₄ inches) |

As a result of the poor lateral capacity of the fasteners specified by the Uniform Building Code, a need exists for a fastener for attaching a gypsum wallboard panel to a wooden building frame that provides a greater resistance in the gypsum wallboard panel to shearing forces caused by seismic and hurricane lateral loading than that which is provided by current fasteners, such as the fasteners specified in the Uniform Building Code.

SUMMARY OF THE INVENTION

An exemplary embodiment of the present invention includes a fastener for securing a 0.625 inch (⅝ inch) thick gypsum wallboard panel to a wooden building frame. The fastener includes a body having a predetermined axial length. The body includes a cupped head at one axial end of the body, having a diameter that is at least in excess of 0.297 inches (¹⁹⁄₆₄ inches), a threaded portion at an opposite axial end of the body and an unthreaded shank portion extending between the cupped head and the threaded portion. The shank portion has an axial length that is at least in excess of one-third of the axial length of the fastener body, and a shank portion diameter that is at least in excess of 0.098 inches.

Another exemplary embodiment of the present invention includes a building structure having a wooden building frame, a 0.625 inch (⅝ inch) thick gypsum wallboard panel and a plurality of fasteners for securing the gypsum wallboard panel to the wooden building frame. Each fastener includes a fastener body of a predetermined axial length having a cupped head at one axial end of the body, having a diameter that is at least in excess of 0.297 inches (¹⁹⁄₆₄ inches), a threaded portion at an opposite axial end of the body and an unthreaded shank portion extending between the cupped head and the threaded portion. The shank portion has an axial length that is at least in excess of one-third of the axial length of the fastener body, and a shank portion diameter that is at least in excess of 0.098 inches.

A further embodiment of the present invention includes a method of attaching a gypsum wallboard panel to a wooden building frame. The method includes providing a wooden building frame, providing a 0.625 inch (⅝ inch) thick gypsum wallboard panel, providing a plurality of fasteners, and installing the plurality of fasteners into the gypsum wallboard panel and into the wooden building frame to secure the gypsum wallboard panel to the wooden building frame. Each fastener includes a fastener body of a predetermined axial length having a cupped head at one axial end of the body, having a diameter that is at least in excess of 0.297 inches (¹⁹⁄₆₄ inches), a threaded portion at an opposite axial end of the body and an unthreaded shank portion extending between the cupped head and the threaded portion. The shank portion has an axial length that is at least in excess of one-third of the axial length of the fastener body, and a shank portion diameter that is at least in excess of 0.098 inches.

BRIEF DESCRIPTION OF THE DRAWINGS

These and other features and advantages of the present invention will be better understood by reference to the following detailed description when considered in conjunction with the accompanying drawings wherein:

FIG. 2 is a side view of the gypsum wallboard panel fastener of FIG. 1 being used to secure a gypsum wallboard panel to a wooden building frame.

DETAILED DESCRIPTION

Figure 1:
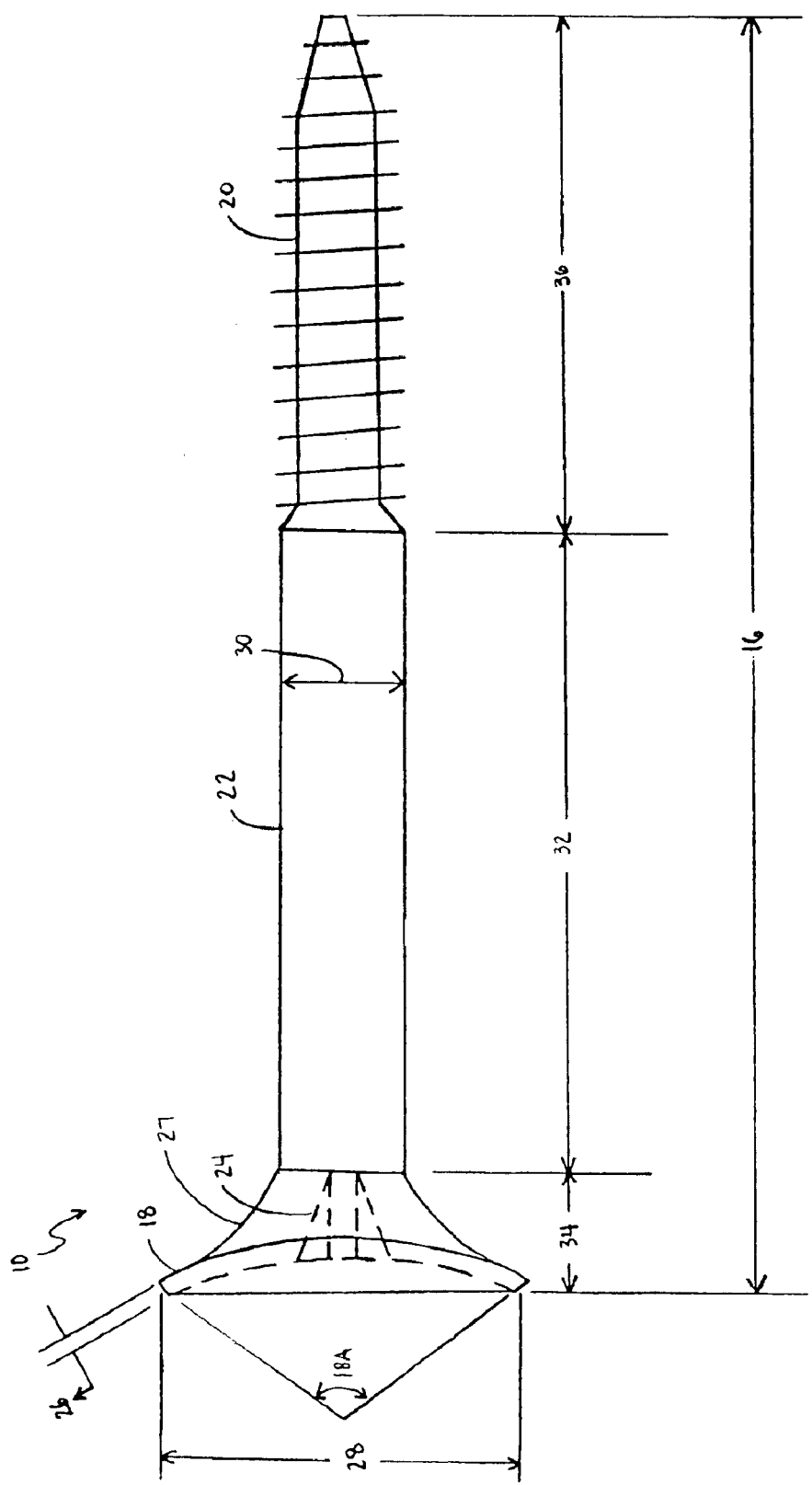
FIG. 1 is a side view of a fastener according to the invention for securing a gypsum wallboard panel to a wooden building frame.

As shown in FIG. 2, the present invention is generally related to a fastener 10 for attaching a gypsum wallboard panel (drywall) 12 to a wooden building frame 14 to improve the resistance of the gypsum wallboard panel 12 to shearing forces caused by seismic and hurricane lateral loading. For example, in one embodiment, the fastener 10 is used to attach the gypsum wallboard panel 12 to the wooden building frame 14, wherein the gypsum wallboard panel 12 is a 0.625 inch (⅝ inch) thick gypsum wallboard panel. In such an example, the gypsum wallboard panel 12 may be a "Type X" gypsum wallboard panel, wherein "Type X" is a term of art in the industry used to specify a fire rating or a density of the gypsum wallboard panel 12.

The fastener 10 may be used to install a new gypsum wallboard panel to a wooden building frame to improve the lateral and shear load resistance of the new gypsum wallboard panel to earthquakes or other forces. Alternatively, the fastener 10 may be used to retrofit an existing gypsum wallboard panel to a wooden building frame to improve the lateral and shear load resistance of the existing gypsum wallboard panel to earthquakes or other forces.

As shown in FIG. 1, the fastener 10 comprises a body having a predetermined axial length 16. The fastener body comprises a head portion 18 at one axial end of the fastener body, a threaded portion 20 at an opposite axial end of the fastener body, and an unthreaded shank portion 22 extending between the head portion 18 and the threaded portion 20.

In one embodiment, the head portion 18 is cupped, i.e., when the fastener 10 is viewed from a top view, the head portion 18 is concave. For example, the cupped head portion 18 may have an included angle 18A of approximately 38 degrees. The head portion 18 may also contain a slot 24 for receiving a fastening tool (not shown) that is used to install the fastener 10 into the gypsum wallboard panel 12 and into the wooden building frame 14. The slot 24 may have any one of a variety of configurations, such as rectangular for receiving a flat head fastening tool, hexagonal for receiving a hex-head fastening tool or cross-shaped for receiving a phillips-head fastening tool, among other configurations. In one embodiment, the slot 24 is configured in a cross-shape and dimensioned to receive a #2 phillips-head fastening tool, such as a #2 phillips-head screw driver.

In an exemplary embodiment, the head portion 18 has a thickness 26 in the range of approximately 0.016 inches (1/64 inches) to approximately 0.031 inches (1/32 inches). Preferably, the head portion thickness 26 is approximately 0.016 inches (1/64 inches). Also in an exemplary embodiment, the head portion 18 has an axial length 34 that is in the range of approximately 0.063 inches (1/16 inches) to approximately 0.125 inches (⅛ inches). Preferably, the head portion axial length 34 is approximately 0.125 inches (⅛ inches).

As shown above in Table 1, the diameter of the head portions of the fasteners specified by the Uniform Building Code range from 0.250 inches (16/64 inches) to 0.297 inches (19/64 inches). The head portion 18 of the fastener 10 of the current invention has a diameter 28 that is at least in excess of 0.297 inches (19/64 inches). For example, in one embodiment, the diameter 28 of the head portion 18 is in the range of approximately 0.375 inches (⅜ inches) to approximately 0.438 inches (7/16 inches). Preferably, the head portion diameter 28 is approximately 0.402 inches (13/32 inches).

The relatively small head diameters of the Uniform Building Code fasteners provide a problem during installation of the Uniform Building Code fasteners. Gypsum wallboard panels typically include an outer protective cover, generally comprised of a paper material. The small head diameters of the Uniform Building Code fasteners create a likelihood that the Uniform Building Code fastener will be installed too far into the gypsum wallboard panel, resulting in a tear in the outer protective cover of the gypsum wallboard panel. When the outer protective cover of the gypsum wallboard panel is torn, it is more likely that the gypsum wallboard panel will prematurely fail. The relatively large head portion diameter 28 of the fastener 10 of the current invention, however, lessens the possibility that the fastener 10 will tear the outer protective cover of the gypsum wallboard panel 12 during installation of the fastener 10. In addition, the relatively large head portion diameter 28 of the fastener 10 of the current invention lessens the possibility that the gypsum wallboard panel 12 will loosen from the wooden building frame 14 when a negative pressure or tensil load is applied to the gypsum wallboard panel 12, such as by a heavy wind load.

As shown in FIG. 1, in a tapered section 27, the fastener 10 tapers from the diameter 28 of the head portion 18 to the diameter 30 of the shank portion 22. For example, the tapered section 27 may form a arc, such as a arc having a radius of approximately 0.234 inches (15/64 inches). In the depicted embodiment, the tapered section 27 is in the form of a "bugle cut," a term that is understood by one skilled in the art of machining as a special type of round cut that resembles the horn of a bugle instrument.

The diameter 30 of the shank portion 22 is at least in excess of 0.098 inches. In one embodiment, the diameter 30 of the shank portion 22 is in the range of approximately 0.125 inches (⅛ inches) to approximately 0.156 inches (5/32 inches). Preferably, the diameter 30 of the shank portion 22 is approximately 0.151 inches. The relatively large diameter 30 of the shank portion 22—as compared to the relatively diameter of the shank portions of the Uniform Building Code fasteners—greatly increases the lateral strength of the fastener 10.

The shank portion 22 has an axial length 32 that is at least in excess of one-third of the axial length 16 of the fastener body. For example, in one embodiment, the axial length 32 of the shank portion 22 is at least 0.5 inches (½ inches) and the axial length 16 of the fastener body is at least 1.50 inches (1½ inches). In another embodiment, the axial length 32 of the shank portion 22 is at least one-half of the axial length 16 of the fastener body. For example, in one embodiment, the axial length 32 of the shank portion 22 is at least 0.875 inches (⅞ inches) and the axial length 16 of the fastener body is at least 1.75 inches (1¾ inches).

In an exemplary embodiment, the axial length 32 of the shank portion 22 is in the range of approximately 0.5 inches (½ inches) to approximately 0.875 inches (⅞ inches) and the axial length 16 of the fastener body is in the range of approximately 1.50 inches (1½ inches) to approximately 1.75 inches (1¾ inches).

In an exemplary embodiment of the invention, the axial length 34 of the head portion 18 is approximately 0.125 inches (⅛ inches), the axial length 32 of the shank portion 22 is approximately 0.875 inches (⅞ inches), the threaded portion has an axial length 36 that is approximately 0.75 inches (¾ inches), the axial length 16 of the fastener body is approximately 1.75 inches (1¾ inches), the diameter 28 of the head portion 18 is approximately 0.402 inches (13/32 inches), and the diameter 30 of the shank portion, 22 is approximately 0.151 inches.

In one embodiment, the fastener 10 is comprised of a machinable metal material, such as AISI C1018 wirestock. Preferably, the fastener 10 is heat treated. Heat treating the fastener 10 increases a ductility of the fastener 10. The increased ductility of the fastener 10 allows the fastener 10 to endure a greater amount of bending before the fastener 10 fractures. The fastener 10 may also be coated with a black oxide. The black oxide coating prevents rust from accumulating on the fastener 10 and adds color to the fastener 10, which creates a distinctiveness that may serve as a source identifier for the fastener 10. The fastener 10 may also be wax coated for lubricity to facilitate the installation of the fastener 10.

As previously discussed, and as shown in FIG. 2, the fastener 10 may be used to install the inch thick gypsum wallboard panel 12 into the wooden building frame 14. A method of installing the fastener 10 comprises inserting the fastener 10 into the gypsum wallboard panel 12 and into the wooden building frame 14 until a perimeter of the cupped head portion 18 is substantially flush with an outer surface of the gypsum wallboard panel 12, thus creating a pocket 37 between the cupped head 18 and the gypsum wallboard panel 12. A joint compound, such as a latex enhanced joint compound, may be applied on the gypsum wallboard panel 12 and over the pocket 37. The joint compound may then be sanded to produce a smooth surface over each pocket 37.

In the embodiment depicted in FIG. 2, the shank portion 22 is dimensioned such that when the fastener 10 is installed at least a portion 40 of the axial length 32 of the shank portion 22 extends into the wooden building frame 14. This allows lateral forces to be transferred from the gypsum wallboard panel 12 to the wooden building frame 14. This also allows the gypsum wallboard panel 12 to laterally bear only on the unthreaded head portion 18 and the unthreaded shank portion 22. This is advantageous because when the gypsum wallboard panel 12 laterally bears on the threads of a fastener, the threads tend to cut into or wear away the gypsum wallboard panel 12.

In an exemplary embodiment, the shank portion 22 is dimensioned such that when the fastener 10 is installed at least 0.375 inches (⅜ inches) of the portion 40 of the axial length 32 of the shank portion 22 extends into the wooden building frame 14.

As previously discussed, the fastener 10 may be used to retrofit an existing gypsum wallboard panel to a wooden building frame to improve the lateral and shear load resistance of the existing gypsum wallboard panel to earthquakes or other forces. However, it is advisable to inspect the existing gypsum wallboard panel prior to installation of the fastener 10 for damage that would lessen the advantage of applying the fasteners 10 to the existing gypsum wallboard panel. For example, if the existing panels have developed diagonal cracks through the body of the panels, the panels should be carefully removed and be replaced rather than retrofitted with the fastener 10.

The preceding description has been presented with reference to certain embodiments of the invention. Workers skilled in the art and technology to which this invention pertains will appreciate that alterations and changes in the described structure may be practiced without meaningfully departing from the principal, spirit and scope of the invention. Accordingly, the foregoing description should not be read as pertaining only to the precise structures described and illustrated in the accompanying drawings, but rather should be read consistent with and as support to the appended claims which are to have their fullest and fair scope.

What is claimed is:

1. A fastener for securing a 0.625 inch thick gypsum wallboard panel to a wooden building frame comprising:
   a body having a predetermined axial length of approximately 1.875 inches, the body comprising:
   a cupped head at one axial end of the body, the cupped head having a diameter that is in the range of 0.297 inches to 0.438 inch;
   a threaded portion at an opposite axial end of the body; and
   an unthreaded shank portion extending between the cupped head and the threaded portion, wherein the shank portion has an axial length that is at least one-third of the axial length of the fastener body, and greater than the thickness of the panel, and wherein the shank portion has a diameter that is in the range of 0.125 inches to 0.152 inch.

2. The fastener of claim 1, wherein the diameter of the cupped head is at least 0.375 inches and the diameter of the shank portion is at least 0.125 inches.

3. The fastener of claim 2, wherein the axial length of the shank portion is at least 0.875 inches and the axial length of the fastener body is at least 1.75 inches.

4. The fastener of claim 3, wherein the diameter of the cupped head is at least 0.402 inches and the diameter of the shank portion is at least 0.151 inches.

5. The fastener of claim 1, wherein the fastener body is comprised of a metal material that has been heat treated to increase ductility of the fastener.

6. A building structure comprising:
   a wooden building frame;
   a 0.625 inch thick, gypsum wallboard panel;
   a plurality of fasteners for securing the gypsum wallboard panel to the wooden building frame, wherein each fastener comprises:
   a body of a predetermined axial length of approximately 1.875 inches having a cupped head at one axial end of the body, having a diameter that is in the range of 0.297 inches to 0.438 inch, a threaded portion at an opposite axial end of the body and an unthreaded shank portion extending between the cupped head and the threaded portion, wherein the shank portion has an axial length that is at least one-third of the axial length of the fastener body, and greater than the thickness of the panel, and wherein the shank portion has a diameter that is in the range of 0.125 to 0.152 inch.

7. The building structure of claim 6, wherein at least a portion of the axial length of each shank portion extends into the wooden building frame.

8. The building structure of claim 7, wherein at least 0.375 inches of the axial length of each shank portion extends into the wooden building frame.

9. The building structure of claim 8, wherein the diameter of the cupped head is at least 0.375 inches and the diameter of the shank portion is at least 0.125 inches.

10. The building structure of claim 9, wherein the axial length of the shank portion is at least 0.875 inches and the axial length of the fastener body is at least 1.75 inches.

11. The building structure of claim 10, wherein the diameter of the cupped head is at least 0.402 inches and the diameter of the shank portion is at least 0.151 inches.

12. The building structure of claim 6, wherein the fastener body is comprised of a metal material that has been heat treated to increase a ductility of the fastener.

13. A method of attaching a gypsum wallboard panel to a wooden building frame comprising:
   providing a wooden building frame;
   providing a 0.625 inch (⅝ inch) thick gypsum wallboard panel;
   providing a plurality of fasteners, wherein each fastener comprises:
   a body of a predetermined axial length of approximately 1.875 inches having a cupped head at one axial end of the body, having a diameter that is in the range of 0.297 inches to 0.438 inch, a threaded portion at an opposite axial end of the body and an unthreaded shank portion extending between the cupped head and the threaded portion, wherein the shank portion has an axial length that is at least one-third of the axial length of the fastener body, greater than the thickness of the panel, and wherein the shank portion has a diameter that is in the range of 0.125 inch to 0.152 inch; and installing the plurality of fasteners into the gypsum wallboard panel and into the wooden building frame to secure the gypsum wallboard panel to the wooden building frame.

14. The method of claim 13, wherein installing the plurality of fasteners includes installing at least a portion of the axial length of each shank portion into the building frame to transfer lateral forces from the gypsum wallboard panel to the wooden building frame.

15. The method of claim 14, wherein installing the plurality of fasteners includes installing at least 0.375 inches of the axial length of each shank portion into the building frame to transfer lateral forces from the gypsum wallboard panel to the wooden building frame.

16. The method of claim 13, further comprising forming each fastener body from a metal material and heat treating the metal material to increase a ductility of each fastener.

17. The method of claim 16, wherein the diameter of the cupped head is at least 0.375 inches and the diameter of the shank portion is at least 0.125 inches.

18. The method of claim 17, wherein the axial length of the shank portion is at least 0.875 inches and the axial length of the fastener body is at least 1.75 inches.

19. The method of claim 18, wherein the diameter of the cupped head is at least 0.402 inches and the diameter of the shank portion is at least 0.151 inches.

20. The method of claim 13, wherein installing the plurality of fasteners includes installing each fastener into the gypsum wallboard panel and into the wooden building frame until a perimeter of each cupped head is substantially flush with an outer surface of the gypsum wallboard panel, thus creating a pocket between each cupped head and the gypsum wallboard panel, the method further comprising applying a joint compound on the gypsum wallboard panel over each pocket and sanding the joint compound to produce a smooth surface over each pocket.

* * * * *